United States Patent
Marshall et al.

(10) Patent No.: US 8,005,823 B1
(45) Date of Patent: Aug. 23, 2011

(54) COMMUNITY SEARCH OPTIMIZATION

(75) Inventors: Brad E. Marshall, Bainbridge Island, WA (US); Christopher L. Scofield, Seattle, WA (US); Elmore Eugene Pope, Sammamish, WA (US); Paul G. Nordstrom, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 351 days.

(21) Appl. No.: 11/692,787

(22) Filed: Mar. 28, 2007

(51) Int. Cl.
*G06F 7/00* (2006.01)
*G06F 17/30* (2006.01)

(52) U.S. Cl. ........ 707/721; 707/713; 707/728; 707/731; 707/759; 707/769

(58) Field of Classification Search ................. 707/3, 5, 707/10, 2, 721, 713, 728, 731, 759, 769; 705/37, 26; 709/203
See application file for complete search history.

(56) References Cited

U.S. PATENT DOCUMENTS

| | | | |
|---|---|---|---|
| 6,385,602 B1 | 5/2002 | Tso et al. | |
| 6,480,837 B1 | 11/2002 | Dutta | |
| 6,493,721 B1 | 12/2002 | Getchius | |
| 6,636,854 B2 | 10/2003 | Dutta | |
| 6,654,742 B1 | 11/2003 | Kobayashi | |
| 6,728,752 B1 | 4/2004 | Chen et al. | |
| 6,772,150 B1 | 8/2004 | Whitman et al. | |
| 6,920,448 B2 | 7/2005 | Kincaid | |
| 6,944,609 B2 | 9/2005 | Witbrok | |
| 6,963,850 B1 | 11/2005 | Bezos et al. | |
| 7,031,961 B2 | 4/2006 | Pitkow et al. | |
| 2002/0032735 A1 | 3/2002 | Burnstein et al. | |
| 2002/0143759 A1 | 10/2002 | Yu | |
| 2003/0120654 A1 | 6/2003 | Edlund et al. | |
| 2004/0111423 A1 | 6/2004 | Irving et al. | |
| 2005/0102282 A1* | 5/2005 | Linden | 707/3 |
| 2005/0125308 A1 | 6/2005 | Puentes et al. | |
| 2005/0203888 A1* | 9/2005 | Woosley et al. | 707/3 |
| 2005/0283468 A1 | 12/2005 | Kamvar et al. | |
| 2006/0074859 A1* | 4/2006 | Gange et al. | 707/3 |
| 2006/0074883 A1* | 4/2006 | Teevan et al. | 707/3 |
| 2006/0106670 A1 | 5/2006 | Cai et al. | |
| 2006/0143160 A1 | 6/2006 | Vayssiere | |
| 2006/0173830 A1* | 8/2006 | Smyth et al. | 707/3 |
| 2007/0005686 A1* | 1/2007 | Fish et al. | 709/203 |
| 2007/0016553 A1* | 1/2007 | Dumais et al. | 707/2 |
| 2007/0061244 A1* | 3/2007 | Ramer et al. | 705/37 |
| 2009/0063477 A1* | 3/2009 | Adams et al. | 707/5 |
| 2009/0144275 A1* | 6/2009 | Fish et al. | 707/5 |
| 2011/0055192 A1* | 3/2011 | Tang et al. | 707/706 |

* cited by examiner

*Primary Examiner* — Mohammad Ali
*Assistant Examiner* — Bao G Tran
(74) *Attorney, Agent, or Firm* — Robert C. Kowert; Meyertons, Hood, Kivlin, Kowert & Goetzel, P.C.

(57) ABSTRACT

A community search system may utilize the results of previous queries from community members and user feedback associated with those results to provide results for subsequent, similar queries from within the same community. Thus, by modifying and combining query results based, in part, on user feedback regarding previous results for similar queries, the trial and error of the many may improve the results for an individual. Users may be grouped into communities whose members are associated by common interests or characteristics. Feedback from one community member may be used to modify the query results for other community members. By analyzing user feedback with the community regarding query results, negative, incorrect or unnecessary results may be omitted or removed from subsequent results for similar queries.

22 Claims, 10 Drawing Sheets

500

| ☑ | Positive |
| ☐ | Neutral |
| ☐ | Negative |

| ☐ | Extremely Positive |
| ☐ | Very Positive |
| ☐ | Positive |
| ☐ | Neutral |
| ☑ | Negative |
| ☐ | Very Negative |
| ☐ | Extremely Negative |

| ☐ | 3 (more positive) |
| ☑ | 2 |
| ☐ | 1 |
| ☐ | 0 |
| ☐ | -1 |
| ☐ | -2 |
| ☐ | -3 (more negative) |

Was this result helpful?
Did it provide the information you desire?

( Yes )  ( No )

*FIG. 5D* initial results
650

| result 600 |
| result 605 |
| result 610 |
| result 615 |
| result 620 |
| result 625 |
| result 630 |

*FIG. 6A* user feedback
660

| result 600 | ☐ |
| result 605 | ☐ |
| result 610 | P |
| result 615 | ☐ |
| result 620 | N |
| result 625 | P |
| result 630 | ☐ |

*FIG. 6B* modified results
670

| result 610 |
| result 625 |
| result 600 |
| result 605 |
| result 615 |
| result 630 |

*FIG. 6C* results 720

| result 600 |
| result 605 |
| result 610 |
| result 615 |
| result 620 |
| result 625 |
| result 630 |

*FIG. 7B* modified results 730

| result 610 |
| result 625 |
| result 600 |
| result 605 |
| result 615 |
| result 630 |

*FIG. 7C* results 760

| result 600 |
| result 605 |
| result 610 |
| result 790 |
| result 792 |
| result 620 |
| result 794 |
| result 796 |
| result 625 |

*FIG. 7D* combined results 770

| result 610 |
| result 625 |
| result 790 |
| result 792 |
| result 794 |
| result 796 |
| result 600 |
| result 605 |
| result 610 |

*FIG. 7E*

COMMUNITY SEARCH OPTIMIZATION

BACKGROUND OF THE INVENTION

1. Field of the Invention

This invention relates to computing systems and, more particularly, to combining query results for multiple, similar queries according to user feedback on the query results.

2. Description of the Related Art

The Internet can be viewed as a large collection of documents, for example, text files, web-pages, newsgroup postings or pictures. To locate documents on the Internet, users typically use an Internet search engine. The user would enter one or more key words and perhaps indicate Boolean operators for the search, and transmit the search request to a server including a search engine. Search engines include a spider program or crawler that periodically visits web pages and searches the Internet to locate new web pages and revise previously located sites to look for changes. The spider then places information from the pages it locates into a database index that relates URLs to search terms.

Internet search engines provide a means of searching through the vast amount of documents to produce a results list of the documents found which match the terms in a search query. Typically the results list is presented as a list of document summaries that includes hyperlinks ("links") that connect each entry to the appropriate Internet document. The results list is generally ranked by relevance (in relation to the query), with each entry included in the list presented either higher or lower on the list according to the relevance ranking as determined by the search engine being used. The way in which these relevance rankings are determined is constantly evolving as the Internet continues to evolve.

On the Internet, search queries are processed by search tools known as "search engines" that typically present a sequential list of matching data items ranked by relevance, from most relevant to least relevant. As a result, the matching data items that best satisfy the search criteria are presented at the top of the list, with the other matching data items presented further down the list in order of decreasing relevance. For example, web pages or web sites with web pages that contain the greatest number of the search terms receive the highest relevance ranking and are presented at the top of the list.

Search engines apply different algorithms to "filter" the available documents and assign relevance rankings to the documents reviewed. The relevance rankings are generally stored in a search index that corresponds to documents for a specific search term (or related search terms). A search engine may locate numerous search results in response to a user search query, many of which may not be relevant. One problem search engine developers must address is the order in which to present the search results. Most search engines use the location and frequency of keywords on a web page as the basis of ranking search results. Other search engines may boost a page's display order if search keywords are included in the meta description and keywords tag of the page. A search engine can also provide a relevancy boost based on the number of pages and/or number of important web pages that include hypertext links to the search result page.

Today's search engines index in excess of 10 billion documents and are the method of choice for finding online content. Although the relevance of search results has been improving with the introduction of ranking based on link counts and similar mechanisms, search engines continue to deliver search results that frustrate users. Consequently, users have come to expect that identifying the correct query to achieve the right results is a process of trial and error. Search engines receive high traffic volumes each day, often by users looking for the same or similar things.

SUMMARY

A community search system may process search queries from members of virtual communities that may be defined by users or dynamically by the community search system. When processing a query from a community member, the community search system may compare the results of the query with similar results from other, similar, queries from with the same community and modify, such as by rearranging, adding or removing, individual results according to user feedback provided for the previous results.

In some embodiments, feedback received from a community member regarding the results of a query may be used to combine those results with subsequent results for a similar query from another member of the same community. For instance, results that previously received negative feedback may be removed from, or alternatively, ranked lower in, results for a similar query. Additionally, query results that previously received positive feedback may be added to, or ranked higher in, results for a similar query.

The community search system may compare queries, results and user feedback within individual communities and may group query users into communities. Community members may be associated by common interests or characteristics and user feedback from community members may be used to modify the query results for other community members. Members of these communities may search for and find online content that matches their interests and needs. Frequently, an individual user may not be an expert at constructing queries that return the desired content. Instead, users frequently use trial and error across several versions of a query before obtaining the desired content. The community search system may allow all the members of a community to improve the search results for individual community members. Individual members of the community may formulate queries in different ways, obtaining search results that are similar, but not exactly the same as those of other community members. By analyzing user feedback from the community regarding query results, negative, incorrect or unnecessary results may be omitted or removed from subsequent results for similar queries.

BRIEF DESCRIPTION OF THE DRAWINGS

FIGS. 5A, 5B, 5C and 5D illustrate example user interface elements for allowing users to indicate user feedback regarding query results, according to certain embodiments.

FIGS. 6A, 6B and 6C are diagram logically illustrating query results modified according to user feedback, according to one embodiment.

FIGS. 7B, 7C, 7D, and 7E illustrating exemplary query results at various stages in a community search, according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

A community search system, as described herein, may utilize the results of previous queries from community members and user feedback associated with those results to provide improved results for subsequent, similar queries from community members. Thus, by modifying and combining query results, based in part on user feedback regarding previous results for similar queries from other members of the community, the trial and error of the many (e.g., the community) may improve the results for an individual community member.

Additionally, a community search system may group query users into communities, whose members may be associated by common interests or characteristics and may use feedback from community members to modify the query results for other community members. Members of these communities may search for and find online content that matches their interests and needs. Frequently, an individual user may not be an expert at constructing queries that return the desired content. Instead, users frequently use trial and error across several versions of a query before obtaining the desired content. The community search system may allow all the members of a community to improve the search results for individual community members. Individual members of the community may formulate queries in different ways, obtaining search results that are similar, but not exactly the same as those of other community members. By analyzing user feedback from the community regarding query results, negative, incorrect or unnecessary results may be omitted or removed from subsequent results for similar queries.

Figure 1:
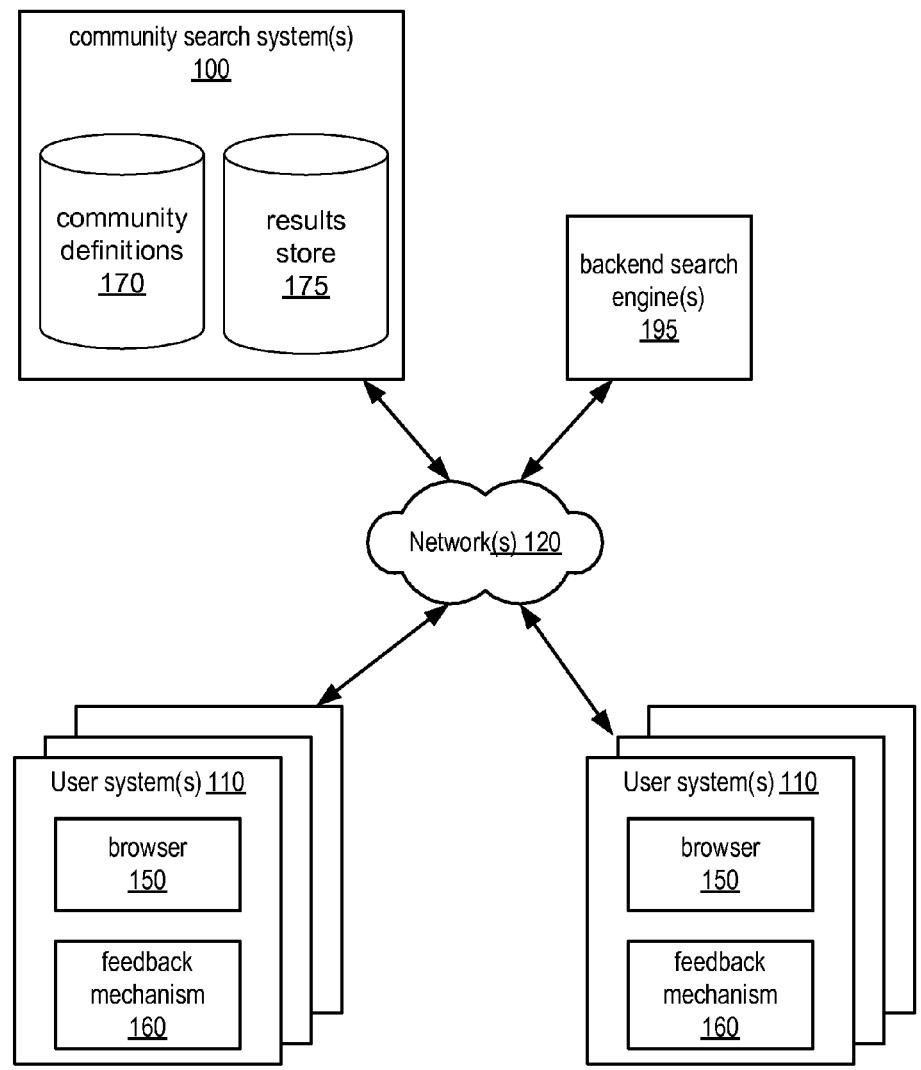
FIG. 1 is a block diagram illustrating one embodiment of a distributed, network system of computer system for implementing community searches, as described herein.

FIG. 1 is a block diagram illustrating one embodiment of a distributed, networked system of computer systems for implementing community searches, as described herein. Community search system 100 may provide community search services to user systems, such as user system 110. For example, a query from a user on user system 110 may be sent to community search system 100 and system 100 may obtain, such as from backend search engine 195, results for the query and return those results to user system 110. User system 110 may include a browser 150 or other software capable of sending user queries to community search engine 100.

Generally speaking, community search systems 100 may be instances of a network server, where a network server may provide access to any suitable type of data that may be conveyed over a network, including but not limited to text documents, still image data, page image data, audio data, video data, metadata such as markup language tags, communication protocol data such as content preambles/epilogues, computer code, and so forth. In many embodiments, system 100 may be configured to provide access to content, such as via query results, to user systems 110 via network-based data request and transport protocols. For example, system 100 may be configured to host network sites implementing Uniform Resource Identifiers (URIs), such as may correspond to web pages, documents or other content, and to receive requests for access to particular URIs formatted in a version of the Hypertext Transport Protocol (HTTP) data transport protocol. In response to such requests, system 100 may be configured to access the content corresponding to the requested URI and/or to provide access, such a via URI links, it to the user system 110 in accordance with the HTTP protocol. It is contemplated that in some embodiments, application layer data transport protocols other than or in addition to HTTP may be used to convey requests for query results or other content to and from system 100.

In some embodiments, a given community search system 100 may be configured as a self-contained, standalone web server that both stores content and receives and processes queries for stored content. In other embodiments, a given system 100 may be included within a complex server architecture. For example, system 100 may be configured as an application or content server that does not actually store content, but is instead configured to retrieve requested content from a database or other repository (not shown) that may not be directly connected to network 120. Additionally, system 100 may be configured to process user queries from community members, as described herein.

User systems 110 in general may encompass any device, system or software application that may be configured to request and/or view network content. For example, a user system 110 may include a general purpose computing system configured to implement a web browser such as a version of Microsoft® Internet Explorer®, Firefox®, Opera™, or another suitable web browser or client application. User system 110 may also include functionality defined by scripts, such as JavaScript modules, configured to execute in a standalone environment or an execution environment provided by a web browser. In some embodiments, a user system 110 may include mobile devices such as cellular phone or wireless devices configured to request content via embedded clients. A user system 110 may further encompass other types of network-attached devices such as television set-top boxes, digital video recorders, electronic book readers, etc.

Community search system 100 may provide query results to user systems 110 in various manners, according to different embodiments. For example, in one embodiment, community search system 100 may receive queries in HTTP requests and supply query results using HTML pages. In other embodiments, other protocols and/or formats may be used. A query result may be considered any indication of a location of network content regarding the query. For example, a query result may be a web link, (URI or URL) or other indication of a network address for network content. In yet other embodiments, results may be provided using different formats.

As noted above, community search system 100 may be configured, in some embodiments, to determine a community with which to associate a user or user query. As noted above, community search system 100 may compare results for a user query with results of similar queries by other members of a community to which the user belongs.

Community Identification

Community membership can be defined is a number of ways. Users may self-select community membership with active choice, members may be identified through traditional affinity grouping (e.g., via demographic information and segmentation), or membership can be determined with passive tracking. In the latter case, queries may be grouped by keyword similarity, creating interest topologies using link traversal frequencies or other mechanisms that cluster users into ad hoc groups. In some embodiments, communities may be based on a user's online habits or by the type of information the user is seeking with the query. Thus, a community may be more than simply a random collection of users. Instead, a community may represent a particular subset of users that are similar to each other regarding some criteria or characteristic used for defining the community. For instance, users that user online queries to search for similar information, such as seeking a particular type of product, information or service, may be grouped into one community. For example, a community may include users that search for information regarding baseball cards (e.g., looking for baseball card information, history, sellers, buyers, auctions, etc.).

In some embodiments, communities may be defined based on similarity between different users' queries and similarity between those users' feedback on the results of those queries. For example, if two users submit similar queries (e.g., queries with at least some keywords in common) and rate the results of those queries similarly (e.g., indicate similar individual results as correct) then those users may be considered part of the same community. In fact, in some embodiments, communities may be identified only by the similarity of queries and the similarity of feedback on results of those queries. In other words, if two people search for information using the same or similar query terms and select (at least some of) the same individual results as being what they where searching for, those users may be considered members of the same community.

In other embodiments, communities may be defined in other manners. For instance, user themselves may select to join certain communities or may be assigned communities based on their job duties or positions, according to some embodiments. Additionally other characteristics of users, such as demographic information, may be used to determine communities within a mass of users. In yet other embodiments, users online browsing habits may be used to determine different communities. For instance, users may be associated with a community or assigned community membership based, at least in part, on commonalties among the online content (e.g., web sites, pages, etc) visited by users. Put another way, users that use network resources, such as online content, in similar manners may be members of the same community. For example, users that frequent online shopping sites may be grouped into one community while users that frequent sites displaying technical specifications may be grouping to another community.

In order to group users into communities, community search system 100 may be configured to monitor, track or otherwise obtain information regarding users. In some embodiments, users may explicitly join to define communities. In other embodiments, however, community search system 100 may analyze various characteristics regarding users and group them into communities or recommend community groupings. Community search system 100 may monitor, track and/or analyze user's online browsing habits and group users that visit sites including similar content into communities. Community search system 100 may compare online content using any of various criteria, such as associated keywords, metadata, network locations, etc.

A community may include any number of users and the size of individual communities may vary greatly. As noted above, query users may be grouped into communities according to any of various characteristics, such as how users structure queries, to employment, to online browsing habits, etc. In general, the more similarity among the members of an individual community (e.g., in terms of the characteristic used to define the community) the more likely that feedback regarding previous query results will improve the correctness of similar queries. In other words, a user seeking online content about a particular sport, say baseball, may receive better (closer to, or including, the desired information) within a community including only baseball fans than within a broader sports community including fans of many different sports, according to one embodiment.

In a more specific example, two users may both be seeking the score in a recent baseball playoff game. One user is a member of a baseball community and the other is a member of a general sports community. The query performed by the general sports community member is more likely to only contain results regarding playoff games in sports other than baseball. Thus, individual communities may be defined narrowing (e.g., community members are more similar to each other) or broadly (e.g., community members less similar to each other), according to different embodiments. In some embodiments, some communities may be narrowly defined while others may be more broadly defined.

In some embodiments, the same user may be a member of more than one community. For instance, continuing the example above, a user that frequents both online shopping and technical web sites may be a member of both communities. When a user that is a member of more than one community performs a search query, community search system 100 may determine a particular community to associate with query. In some embodiments, the user may specifically associate a query with a particular community. For example, a browser plug-in may allow the user to select from among various communities and the browser may include an identification of the selected community with the query when sending the query to community search system 100, according to one embodiment. In general any of various user interface controls may be implemented to allow a user to select a community to associate with a query.

In other embodiments, community search system 100 may be configured to determine which community (of which the user is a member) to associate with the query, as will be described in more detail below. Community search system 100 may analyze the performed query and query results within the associated community, such as by modifying the current query results according to results (including user feedback) for similar queries within the associated community.

Figure 2:
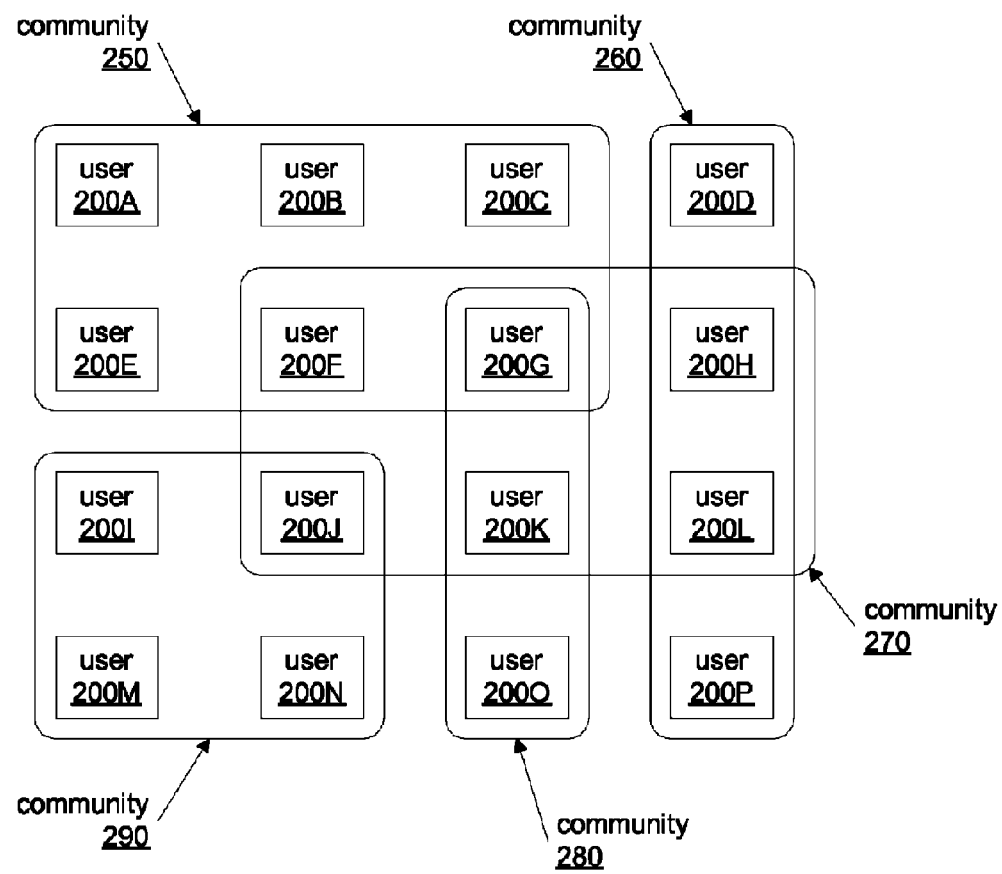
FIG. 2 is a block diagram illustrating logical associations between users and communities, according to one embodiment.

FIG. 2 is a block diagram illustrating logical associations between users and communities, according to one embodiment. FIG. 2 illustrates a group of users 200A though 200P grouped into 5 communities, according to one example embodiment. As described above, community search system 100 may be configured to divide users into communities according to any of various criteria and using various methods. Additionally, user communities may be more statically defined, such as by users themselves or by administrators in some embodiments. As illustrated in FIG. 2, users may be members of more than one community and any number of users may make up a community. Thus, users 200A, 200B, 200C, 200E, 200F and 200G are members of community 250. Similarly, users 200D, 200H, 200L and 200P are members of community 260, users 200F, 200G, 200H, 200J, 200K, and 200L make up community 270. Users 200G, 200K, and 200O are members of community 280 and users 200I, 200J, 200M and 200N are members of community 290.

As can be seen in FIG. 2, a user may be a member of more than one community. For example, user 200F is a member of both community 250 and community 270. Similarly, user 200G is a member of communities 250, 270 and 280. As noted above, communities may be defined by various criteria. Thus, in one embodiment, community 250 may be organized around a particular position at a company while community 270 may be defined by community search system 100 based on the members online browsing habits. For instance, perhaps members of community 250 all work for the same department and the member of community 270 all visit the same or similar web pages or other online resources. Additionally, in the example embodiment of FIG. 2, the members of community 280 may all be assigned to the same demographic segment and therefore community 280 is defined by any of various traditional affinity grouping or other demographic criteria.

Thus, as is apparent from the discussion above regarding FIG. 2, different users may be members of the same or different communities, communities may be defined based on different criteria, a single user may be a member of more than one community and those communities may be defined by different criteria. For instance, in the example above, user 200G may be a member of three communities, one based on work or job position, one based on online browsing habits, and one based on demographic segmentation.

Community search system 100 may be configured, in some embodiments, to determine a community with which to associate a user query. As noted above, community search system 100 may compare results for a user query with results of similar queries by other members of a community to which the user belongs. In some embodiments, community search system 100 may only combine results from similar user queries from users in the same community. Continuing the above example, community search system 100 may determine, for a query from user 200G, which community (e.g., community 250, 270 for 280) should be associated with the query. Community search system 100 may be configured to utilize various different methods or manners to determine a community to associate with a query and its results, according to different embodiments. In one embodiment community search system 100 may receive an indication of a community with the search query. For example, a browser extension, plug-in or other software on a user's machine, such as feedback mechanism 160, may determine a community for a search query and send an indication of that community to community search system 100. In some embodiments, feedback mechanism 160 and/or other software/firmware on a user's system may allow the user to explicitly select or indicate a community with which to associate a query. In other embodiments software (e.g., feedback mechanism 160 and/or other software/firmware) on a user's computer may determine a community in others ways, including those described herein regarding community search system 100.

In another embodiment, community search system 100 may compare the query to other queries by other members of the same communities to which the user belongs in order to determine which community should be associated with the user query. For instance, the terms used, as well as other characteristics, of the user query may be compared to the terms used in other queries by other users to determine a community. Thus, keyword similarity may be used by community search system 100 to determine whether a user query should be associated with a particular community.

FIG. 2 represents merely one example embodiment of groups of users that are members of various communities. In other embodiments, different numbers of users may be grouped into a different number of communities. Additionally, community search system 100 may not maintain any visual representation of community membership as illustrated in FIG. 2. Instead, in some embodiments, community search system 100 may store or maintain community membership in any of various manners, such as in a traditional database, a user identity database, such as an LDAP database, or other community definitions 170. Community search system 100 may store the information representing community members in various manners as well, according to different embodiments. For example, community search system 100 may store information regarding the various communities in one data store, such as in a database and may store indications of which communities a user is a member of in a data store regarding user information or along with other user information stored along with query and/or query results information.

Figure 3:
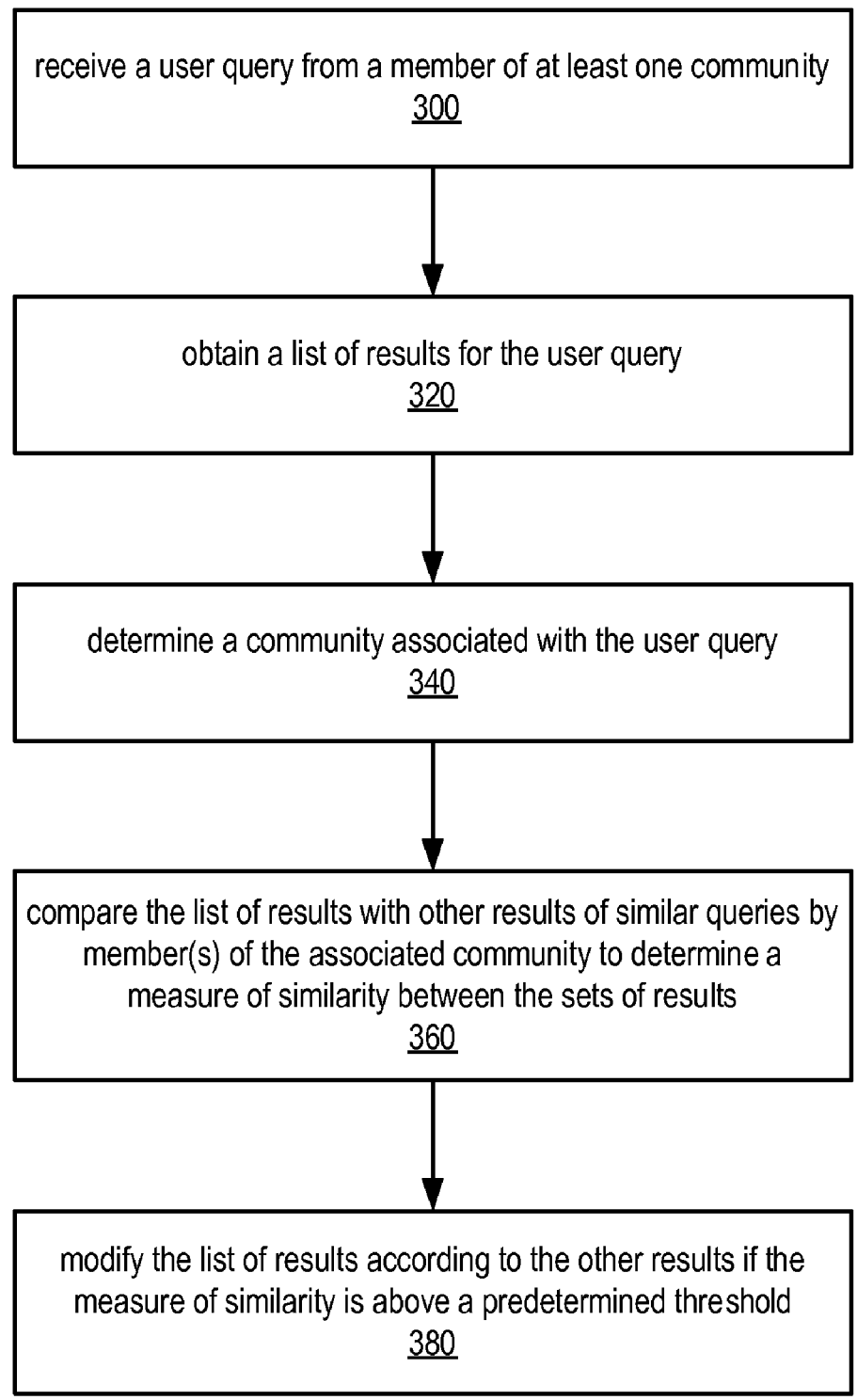
FIG. 3 is a flowchart illustrating one embodiment of a method for performing a community search, as described herein.

FIG. 3 is a flowchart illustrating one embodiment of a method for performing a community search, as described herein. As indicated by block 300, community search system 100 may receive a user query from a member of at least one community. As described above, a user may be a member of more than one community. In some embodiments, community search system 100 may modify the query based on similar queries previously performed within the same community. For example, community search system 100 may add, remove or modify the individual search terms of the query based on the search terms used in other, similar, queries. For instance, system 100 may add an additional search term if that additional term is included in the other queries.

Community search system 100 may also obtain a list of results for the user query, as illustrated by block 320. In some embodiments, community search system 100 may include a search engine configured to determine results for queries. In other embodiments, however, community search system 100 may be configured to utilize external, third-party and/or commercial search engines, such as backend search engine(s) 195, described above. Therefore, in some embodiments, community search system 100 may forward a user query to backend search engine 195 and receive results for the query in return. In certain embodiments, community search system 100 may send a user query to more than one backend search engine 195 and aggregate or combine the results received from the different search engines into a single set of results for the user.

In some embodiments, community search system 100 may also determine a community associated with the user query as indicated by block 340. For example, as noted above, community search system 100 may compare the user query to other queries from other members of the same communities to determine which community the user query should be associated with. In other embodiments, the user may explicitly select which community should be associated with the query. In yet other embodiments, community search system 100 may not associate a specific community with a query at all, but may, as will be explained in more detail below, compare query results with other results from similar queries in more than one of the user's communities.

Community search system 100 may also compare the list of results obtained for the user query with other results for one or more similar queries by other members of the same community associated with the user query in order to determine a measure of similarity between the sets of results, according to some embodiments. In one embodiment, community search system 100 may first determine whether the user query is similar to any other queries by other members of the community previous associated with the user query. For example, community search system 100 may maintain a database or other data store including the queries and results of those queries, such as in results store 175, and therefore may search through the stored queries associated with the same community as the user query to determine if any of them are similar to the user query.

When comparing queries, community search system 100 may utilize any of various methods, such as keyword comparison, to determine how similar two queries are and to compare the measure of similarity between different pairs of queries. For example, community search system 100 may calculate a measure of similarity between two queries by determining the total number of search terms in common between the two queries. For more complex queries, community search system 100 may also take into account (e.g., include in a measure of similarity) the structure of a query, such as any binary operators used to form the query. By comparing a determined measure of similarity between the user query and the other queries, community search system 100 may determine one or more other queries whose similarity to the user query is above a certain threshold, either hard-coded, user-specified, community-driven, or dynamically determined. When a measure of similarity between two queries is above a certain threshold, community search system 100 may consider those two queries as 'similar' to each other.

Community search system 100 may, in some embodiments, be configured to compare the list of results with one or more other lists of results for other similar queries by one or more members of the community associated with the query to determine a measure of similarity between the sets of results, as indicated by block 360 and described below. Additionally, community search system 100 may, in some embodiments, modify the results of the user query according to the other results if the measure of similarity between the sets of results is above a predetermined threshold, as indicated by block 380.

Additionally, in some embodiment, community search system 100 may also update a results store, such as results store 175 according to the user feedback. For instance, results store 175 may include queries, results and feedback previously stored by community search system 100 and system 100 may update results store 175 to reflect more recent feedback. In some embodiments, system 100 may add the new query, results and/or feedback to results store 175. As noted above, community search system 100 may be configured to maintain separate sets of queries, results and feedback for each community and, in some embodiments, for each user of each community.

Comparing Search Results

As described above, community search system 100 may be configured to compare the results of previous queries with the result of a current query, such as to modify the new results according to user feedback on previous results. Generally, comparing two sets of results may involve determining how many results are common to both lists. Since results receiving negative votes may be removed or deleted from results lists prior to being saved by community search system 100, the results stored for a query may be very different than the original results for that query or the results that are obtained for that query when issued subsequently.

Community search system 100 may be configured to compare results lists and to determine a degree or level of similarity between those lists using any of various metrics. For example, in one embodiment, community search system 100 may use the number of results common to both results list as a level of similarity between the two lists. In other embodiments, the level of similarity between two lists may not be symmetrical. For example, in one embodiment, community search system 100 may assign a level of similarity regarding one result list as compared to another.

As an example, community search system 100 may calculate how similar one a result list L1 is to result list L2 by calculating the number of results common to both lists (e.g., the number of results that appear in both lists) and divided by the total number of results in list L1. Please note that in this example, the similarity of list L1 to list L2 may be different from the similarity of list L2 to list L1. Community search system 100 may be configured to calculate a value, S(L1, L2) representing the similarity of list L1 to list L2 by calculating:

$$S(L1, L2) = \frac{|L1 \cap L2|}{|L1|}.$$

In other words, the similarity of L1 to L2 may be calculated as the size of the intersection of lists L1 and L2 divided by the size of the L1. Please note that in the above example, S(L1, L2) may not be the same as S(L2, L1). In fact, unless the two results list have exactly the same number of results, S(L1, L2) will be different than S(L2, L1) for this embodiment.

In other embodiments, however, community search engine 100 may use different methods and manners to determine whether two result lists are similar and/or to determine how similar the results list are. For example, in some embodiments, community search system 100 may also compare user feedback received regarding the results lists as part of determining a measure of similarity between the two sets of results. Thus, if two communities members both provide similar feedback to results of similar queries, the two results lists may be considered similar.

When comparing results lists, community search system 100 may be configured to compare the level of similarity (e.g., how similar one list is to another) to a predetermined or otherwise specified threshold to determine a binary value of whether one list is 'similar' to the other. In other words, in some embodiments, community search system 100 may be configured to only consider one list 'similar' to another if a calculated level of similarity is above a certain threshold. In some embodiments, list L1 may be determined to be similar to list L2 while list L2 is determined not to be similar to list L1.

Such a threshold may be hard coded, user specified, dynamically determined, or specified in some other way, according to various embodiments. For example, community search system 100 may be configured to use different thresholds for different communities or even different community members, in some embodiments. For instance, one community or user may desire to receive more inclusive results and therefore may specify a lower threshold for similarity. Conversely another community or user may desire to receive only those results most likely to be correct and therefore may specify a higher threshold for similarity.

Figure 4:
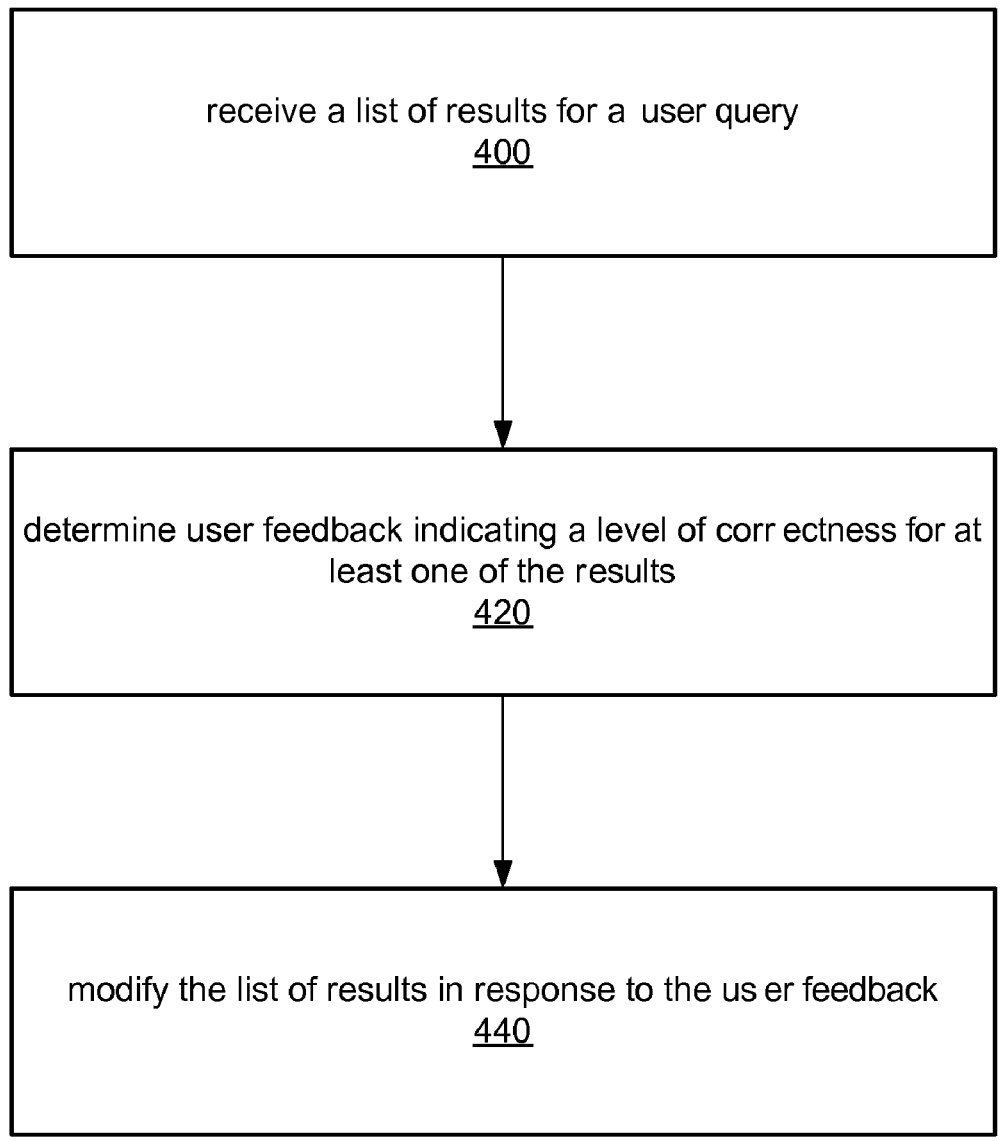
FIG. 4 is a flowchart illustrating one embodiment of a method for using previous user feedback to modify current query results.

In some embodiments, community search system 100 may also be configured to take into account previous users' feedback on query results. For example, FIG. 4 is a flowchart illustrating one embodiment of a method for using previous user feedback to modify current query results. Thus, community search system 100 may receive a list of results for a user query, as indicated by block 400. Community search system 100 may also determine user feedback indicating a level of correctness for at least one of the results, as shown in block 420. In other words, community search system 100 may allow users to specify which results where more 'correct', that is more helpful, such as by providing the information desired by the user, than other results. After obtaining user feedback for a set of results, community search system 100 may modify the list of results for the user query in response to the user feedback, as indicated by block 440. In some embodiments, the modified results may be presented to the user, such as to allow the user to review and verify the modified results or to provide additional feedback on the modified results, for example. Community search system 100 may then store or save the modified results for use with subsequent query results.

For example, community search system 100 may be configured to reorder a list of results based on the user feedback in one embodiment. For instance, community search system may rank a result that received positive feedback higher than a result that received neutral or negative feedback. In other words, if user feedback indicates a higher level of correctness for one result than for another, community search system 100 may rank or order the one result higher than the other. In other embodiments, community search system 100 may remove or delete results that receive negative user feedback. As noted above, community search system 100 may store, save or otherwise maintain the results of previous searches and may store or maintain user feedback for those results as well, such as in results store 175. In one embodiment, community search system 100 may store the modified results while in other embodiments, community search system may save the unmodified results but also store the user feedback.

User Feedback for Search Results

A community search system 100, as described herein, may be configured to measure and record whether individual results for a query actually provided the information or result the user desired. Community search system 100 may then modify future results for similar queries according to the user feedback in some embodiments. For instance, in some embodiments users may indicate the "correctness" of individual results as compared to the user's desired result and community search system 100 may track and record those indications. In other words, "correct" results may be those results that have, supply or provide the information, content or other resource the user was searching for when for issuing the query. In one embodiment, individual search results may be marked by a user as being a positive result, a negative result or a neutral result.

In some embodiments, all results may be assigned a default neutral level of correctness. In other words, until the user indicates otherwise, community search system 100 may be configured to assume that results are neither positive nor negative. In other embodiments, however, results may not be assigned a default level of correctness or may be assigned a different default.

User feedback may be indicated or determined in a number of different ways, according to various embodiments. For example, community search system 100 may employ any of various mechanisms to allow users to mark search results as positive, negative or neutral. For example, in one embodiment, a client-side widget or other client-side logic, such as feedback mechanism 160, may be displayed as a user scrolls over a search results listing. The widget may allow the user to indicate which results the user considers positive (e.g., providing the desired information), negative (e.g., not providing the desired information), or neutral (e.g., not look at by user). In some embodiments, the user may only be able to select between a positive and negative indication and results that the user does not other indicate as positive or negative may be considered of neutral correctness. The act of a user indicating whether a result correctly identified the desired information may be considered "voting" for the result, and may be referred to as such herein.

FIGS. 5A, 5B, 5C and 5D illustrate example user interface elements for allowing users to indicate user feedback regarding query results, according to certain embodiments. For example, feedback mechanism 160 may be configured to display a popup menu over a result in a results list, such as in response to a user right clicking a mouse on a result. Thus, user interface 500 may be displayed allowing a user to select among a positive, negative or neutral indication of a level of correctness for a query result. While FIG. 5A illustrates a popup list of checkboxes, in other embodiments, other user interface elements may be used, such as radio buttons, push buttons, etc. FIG. 5B illustrates a similar user interface 520 that includes more choices thereby allowing more granularity to the available user feedback choices. In some embodiments, community search system 100 and/or feedback mechanism 160 may display textual choices to the user, as illustrated in FIGS. 5A and 5B while storing user feedback in numeric form, such as by assigned a different number to each feed back option. Thus, in other embodiments, however, feedback mechanism 160 may display numeric choices to the user, as illustrated by user interface 540 in FIG. 5C. In yet other embodiments, feedback mechanism 160 may also display a popup window or dialog box requesting a binary (e.g., yes or no) indication of user feedback regarding a query result, such as illustrated by dialog 560 in FIG. 5D. In general, any suitable user interface element allowing user selection from among a variety of user feedback options may be utilized by community search system 100 and/or feedback mechanism 160 to receive user feedback regarding query results, as described herein.

While in some embodiments a user may only indicate a single, binary vote (e.g., either positive or negative) regarding a result, in other embodiments, as noted above, a user may be able to assign a value from a range of values to indicate how correct, appropriate or helpful a particular result was. For example, in one embodiment, feedback mechanism 160 may be configured to allow a user to select a value from range of 0-10 (e.g., 0-5 may indicate varying degrees of negative votes and 6-10 may varying degrees of positive votes) to indicate how "correct" a result was. In other embodiments, other ranges and values other than numeric may be used to allow a user to specify or indicate the relative correctness of individual results. For example, feedback mechanism 160 may be configured to display a popup (or other) list box allowing the user to select from various options regarding the results, such as "extremely helpful, very helpful, helpful, not helpful, extremely not helpful" to give just one example embodiment. In general, user feedback may be indicated and/or recorded using virtually any suitable scale or range of values (either numeric or other).

While the examples above describes active user feedback (e.g., the user actively indicating or voting for positive or negative results), in some embodiments, community search system 100 may rely on passive user feedback. For example, if a user examines, reads, or otherwise interacts with a particular result, this activity may be considered by community search system 100 as a positive indication of correctness for the result. In other words, users typically don't spend much time or effort reading a result that does not provide them the information they are seeking. Therefore, if a user spends time and/or effort to open, access, view, read, or otherwise examine a result, community search system 100 may interpret that as a positive vote for that particular result. Conversely, if a user does not open, access, view, read or otherwise examine a result, community search system 100 may interpret that as a negative vote in some embodiments. In other embodiments, not opening or accessing a result may be interpreted as a neutral vote regarding the remark.

Additionally, in yet other embodiments, community search system 100 may be configured to interpret a user not opening a particular result as a neutral vote unless the user opens or reads a result further down the list of results. In such a case, community search system 100 may be configured to interpret a user not reading a first result but reading a subsequent result as a negative vote regarding the first result. To put in another way, if a user doesn't read one or more results after finding the sought after information, the user is not actually making either an explicit or implicit indication regarding the "correctness" of those unread results. However, if a user skips over a results, but reads a subsequent result, the user may have felt that the skipped result would not supply the sought after information.

In the examples above, community search engine 100 is described as being configured, in some embodiments, to interpret a user's action regarding individual results as indications of whether the user thinks those results provide the information the user is seeking (by making the query in the first place). There are many different ways in which community search system 100 may determine a user's passive feedback regarding query results. For example, in one embodiment, the fact that a user accessed a result at all may be considered by community search system 100 as a positive vote for the result. In other embodiments, however, the amount of time a user spends reading or viewing a result may be important to determining whether the user's actions should be considered a positive vote or not for the result. Similarly, in some embodiments, community search system 100 may be configured to determine an estimate of the amount of a result that the user read and viewed. For instance, community search system 100 may interpret a user's action of scrolling down or reading past the first page of a result as a positive vote for that result. Additionally, other user actions, such as copying, saving, or bookmarking a result may be interpreted as a positive vote for the result.

In some embodiments, software or firmware on a user's computer, such as a browser plug-in or feedback mechanism 160, may be configured to detect or capture a user's action regarding the results of a community-based search query and to communicate those actions to community search system 100. In various embodiments, feedback mechanism 160 may be configured to capture a user's actions regarding accessing, viewing, reading, saving, bookmarking, copying or otherwise interacting with a query result and may include various additional software object or processing, such as special browser extensions or custom controls to aid in detecting and/or capturing such user actions.

In some embodiments, community search system 100 may be configured to save, store and/or maintain the results of community members' queries as well as the members' voting or indications as to the correctness of the results. For example, community search system 100 may maintain a results store 175 including members' queries, results and votes on the results. In one embodiment, a database of results and their associated votes may be maintained and indexed according to the terms of the respective queries. Additionally, since different communities and different community members may have different votes as to the correctness of the same result for the same query, community search system 100 may be configured to maintain separate copies of results for different communities or even for different community members, along with the votes for those results. In other embodiments, community search system 100 may be configured to store an aggregate of results for similar queries while maintain separate information indicating the way that different communities or community members voted on those results.

A user's votes regarding a result may be used as a weighting factor when modifying a result list for a subsequent query. Additionally, community search system 100 may be configured to maintain a community-wide weight associated with results, according to some embodiments. For example, in one embodiment, community search system 100 may be configured to store a community weight corresponding to the total number of positive votes for the result minus the total number of negative votes for a result. In another embodiment, community search system 100 may be configured to calculate or maintain community weights in a different manner, such as by weighting more recent votes more heavily than older votes for a result. In yet another embodiment, community search system 100 may be configured to weight user feedback regarding results based, at least in part, on the effort it took the user to find a positive result. For example, if the user only found a positive results on the fourth page of results, community search system 100 may weight that positive feedback more heavily that if the user found several positive results at the top of a results list, according to some embodiments.

In some embodiments, community search system 100 may be configured to store queries, results and their corresponding votes locally on the same machine. In other embodiments, however, community search system 100 may distribute the storage of queries, results and their corresponding votes to other machines.

Modifying Query Results

As described above, community search system 100 and/or feedback mechanism 160 may be configured to modify a set of results for a query based on received user feedback. For example, rather than simply storing the entire result list and its associated user feedback (e.g., the votes for individual results), community search system 100 may, in some embodiments, be configured to modify the result list according to the user feedback. For example, in response to a negative vote for a result community search system 100 may delete that result from the results list prior to storing the results, such as in results store 175. In other embodiments, however, the results may be stored including results that received negative user feedback, but those results may be removed, omitted or deleted from future results list for similar queries from members of the same community prior providing the results lists to the user. In other words, after some number of users have indicated that a particular result is not a correct, helpful or appropriate result for a particular query, community search system 100 may delete that result when it appears in future results lists for similar queries.

In some embodiments, community search system 100 may be configured to re-order or re-rank a results lists in response to user feedback—either previously received feedback from other community members or currently received feedback from the member performing the query. As noted above, a results list for a given query may be ranked according to any of various criteria, such as popularity, age, the number of times query terms appear in the result, etc. FIGS. 6A, 6B and 6C are diagram logically illustrating query results modified according to user feedback, according to one embodiment. FIG. 6A illustration a list of initial results 650 including results 600, 605, 610, 615, 620, 625 and 630, from a user query. As described above, community search system 100 may allow a community member to provide user feedback regarding the results of a query and FIG. 6B illustrates user feedback 660 showing that a user indicated that results 610 and 625 were positive results and that result 620 was a negative result, according to one embodiment. FIG. 6C illustrates the results after being modified, such as by community search system 100 and/or feedback mechanism 160, according to various embodiments. Thus, modified results 670 illustrates that community search system 100 moved the two results that received positive user feedback (i.e., results 610 and 625) to the top of the list of results and deleted the result that received negative user feedback (i.e., result 620) from the list. In some embodiments, community search system 100 may store the modified result list 670, perhaps along with user feedback 660, for use with other query results, as will be described in more detail below.

FIGS. 6A, 6B and 6C represent logically, according to one embodiment, an exemplary set of query results, user feedback and manner of modifying the results according to the user feedback. Furthermore, FIGS. 6A, 6B and 6C are not intended to literally represent any particular style, format, or method of displaying, storing, or representing query results, user feedback and/or modifying results according to user feedback.

Additionally, in some embodiments, community search system 100 may order or rank results according to previous user feedback, such as for other, similar queries and results, regarding the correctness of results. Thus, the result that has previously received the most positive feedback may be listed first in a results list, while those results that have received negative or no feedback may be listed last (or not listed at all), according to various embodiments. Additionally, community search system 100 may move individual result up or down a results list based on previous user feedback for similar results list (from similar queries). For example, one example of weighting user feedback given above was to weight a positive result found on the fourth page of results more heavily than a positive result found on the first page of results. In one embodiment, community search system 100 may be configured to move both positive results up the results list, but may move the positive result found on the fourth page by relatively more places than the positive result found on the first page. However, in some embodiments, community search system 100 may be configured to group all results that have received positive feedback at the top of a results list and therefore relative weights given to positive results may not affect the number of places a result is moved, but may affect that ordering of the positive results.

As noted above, community search system 100 may be configured to apply the results of previous queries to subsequent similar queries. Thus, when community search system 100 receives a query with similar search terms to a previous query, community search system 100 may access the results and votes for the previous query for comparison with the results of the new query, as will be described in more detail below.

Combining Search Results

As noted above, community search system 100 may be configured to combine result lists of similar queries in some embodiments. Thus, the results of a previous query may be combined with results of a new query if the two queries and the results of those queries are 'similar' or similar enough. For example, if community search system 100 determines that the level of similarity between the two queries is above a certain threshold and also calculates that the level of similarity between the two sets of results is above a certain threshold, community search system 100 may combine the two sets of results.

As described above, community search system 100 may combine the results from a previous query with those of one or more similar recent queries before returning the results of the recent query to the user, according to some embodiments. Since, as noted above, community search system 100 may also be configured to modify query results based on user feedback, the results of a new query may be combined with a previous results list that was modified according to user feedback, such as by removing those results receiving negative feedback. For example, if a first community member provides negative feedback for several results, community search system 100 may remove those same results when another community member uses a similar query.

However, since removing results that received negative feedback from a results lists may affect the calculated level of similarity between that results list and another results lists, community search system 100 may, in some embodiments, be configured to store complete results lists (e.g., including results that receive negative feedback) but take into account the negative results when combining results lists. As an example of how removing results that receive negative feedback can effect the level of similarity between two results lists, consider the example used above to calculate S(L1, L2). Since, using the above example, the level of similarity is calculates as the ratio of the number of results common to both lists over the total number of results in list L1. Thus, if community search system 100 removes results from L2 that received negative feedback before calculated S(L1, L2), and if list L1 has not received any user feedback, and therefore may include those same negative results, the total number of results in common between the two lists will be less than if the negative results were not removed. In other words, the manner in which community search system 100 determines whether two lists are similar (and how similar they may be) and the manner in which community search system 100 determine whether to combine results lists may be related or dependent in order to improve future community query results (e.g., supply the user with more 'correct' or positive results and fewer 'incorrect' or negative results).

Figure 7A:
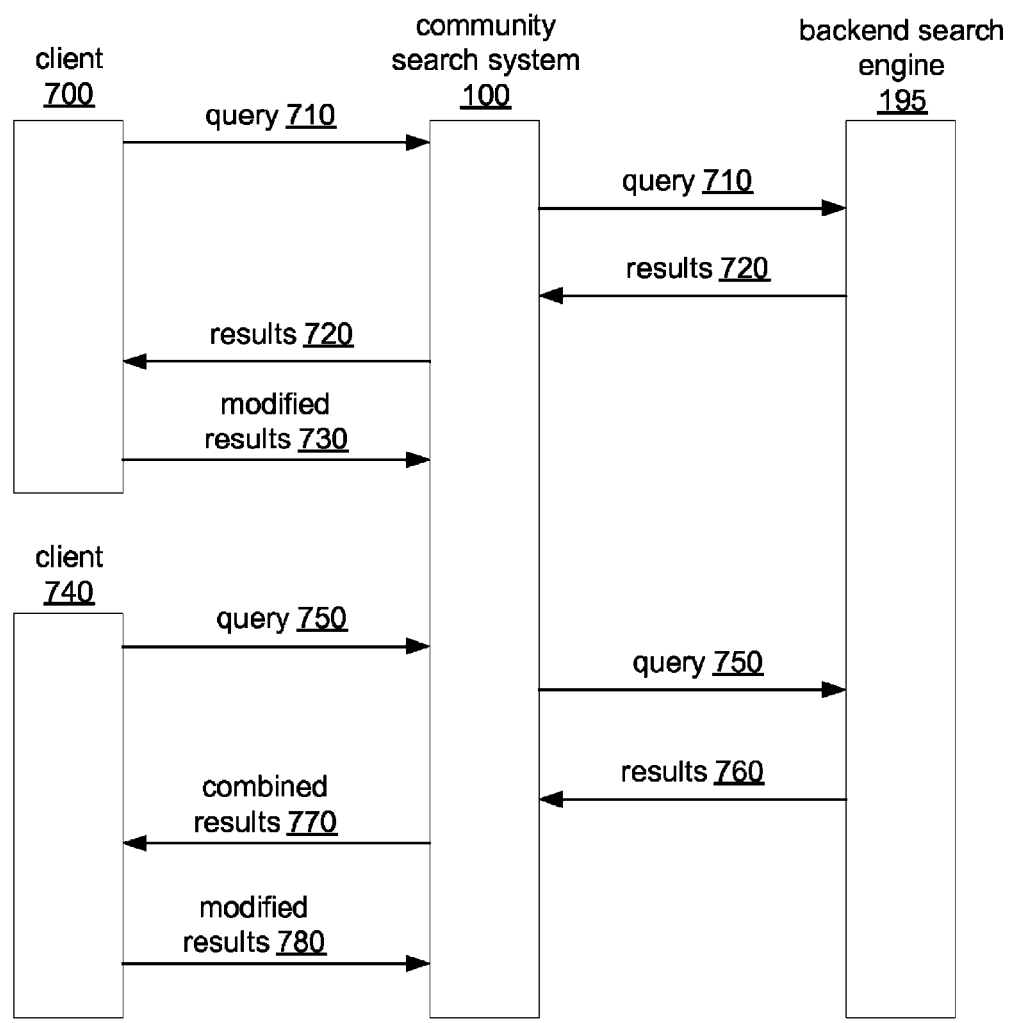
FIG. 7A is a block diagram illustrating the combining query results, according to one embodiment.

In some embodiments, community search system 100 may be configured to combine two results lists such that the positive results from one list are added to the other and/or such that the negative results from one list are removed from the other. For example, FIG. 7A is a block diagram illustrating the combining query results, according to one embodiment. Clients 700 and 740 may represent user computers, such as user system 110, described above regarding FIG. 1. Thus, a user may issue query 710 from client 700 to community search system 100. In response, community search system 100 obtain results for query 710, such as by submitting query 710 to one or more backend search engines 195, and may receive results 720 in response. In this example, community search system 100 may not modify results 720 or combine results 720 with any other results. For instance, query 710 may be the first query from a member of a certain community and therefore community search system 100 may not have any previous query results to combine with results 720. Thus, community search system 100 may return results 720 to client 700.

As described previously, community search system 100 and/or user feedback mechanism 160 may be configured to allow a user to provide user feedback regarding query results. For example, feedback mechanism 160 on client 700 may collect user feedback (e.g., in any of the manners described above) from the user and return modified results 730 to community search system 100, according to one embodiment. According to other embodiments, not illustrated in FIG. 7A, client 700 and/or feedback mechanism 160 may not modify results 720 directly, but instead may provide user feedback regarding results 720 to community search system 100 and community search system 100 may modify results 720 yielding results 730.

Subsequently, community search system 100 may receive query 750, which may be similar to query 710, from client 740. As with query 710, community search system 100 may submit query 750 to one or more backend search engines 195 and receive results 760 in response. Rather than simply provide results 760 to client 740, community search system 100 may combine results 760 with results 720 and/or with modified results 730 based on user feedback received regarding results 720. As described above, community search system 100 may be configured to only combine search results that are determined to be sufficiently similar to each other, such as by determining that a calculated measure of similarity between to sets of results is above a predetermined threshold. Moreover, only results for queries of a predetermined level of similarity may be compared and possibly combined according to some embodiments. In other words, if two queries are sufficiently similar (e.g., a calculated measure of similarity between the two queries is above a threshold) and if the respective results for those queries are also sufficiently similar, community search system 100 may combine those results according to user feedback for the results.

Thus, community search system 100 may combine results 760 with modified results 730 and supply the resulting combined results 770 to client 740. A user of client 740 may then provide user feedback regarding combined results 770 and return modified results 780 to community search system 100. As with modified results 730, in some embodiments, client 740 and/or feedback mechanism 160 may not actually produce modified results 730, but instead may send the user feedback regarding combined results 770 to community search system 100 and community search system 100 may produce modified results 780. In other embodiments, community search system 100 may not actually produce a list of modified results 780, but instead may store the user feedback regarding combined results 770 along with combined results 770 subsequent comparison and possible combination with similar results from other similar queries.

FIGS. 7B, 7C, 7D, and 7E illustrating exemplary query results at various stages in a community search, as described herein and according to one embodiment. Thus, FIG. 7B illustrates results 720, discussed above. For ease of explanation, results 720 may be the same as initial results 650 described above regarding FIG. 6A. FIG. 7C illustrates modified results 730, such as resulting from modifying results 720 according to user feedback, as described above. Modified results 730 illustrates a reordering of results and the removal of one result, as described above regarding FIG. 6B. FIG. 7D illustrates results 760 for query 750, described above. As illustrated by a comparison of results 720 (or modified results 730) and results 760, the two sets of results have several results in common.

According to some embodiments, community search system 100 may determine a level of similarity between the two sets, as described previously. For instance, in one embodiment, community search system 100 may determine a measure of similarity between results 720 (or modified results 730) and results 760, such as by calculating the ratio of the number of results in common between two sets to the total number of results in one of the sets. Therefore, community search system 100 may, according to one example embodiment, determine a measure of how similar results 760 are to results 720 as the ratio of 5 (the number of results in common) to 9 (the number of results in results 760) yielding a similarity measure of 5/9. If the calculated measure of similarity is above a predetermined threshold, community search system 100 may combine results 720 (or modified results 730) with results 760 according to the user feedback for results 720. Thus, FIG. 7E illustrates combined results 770 including results 760 along with those results from results 720 that received positive user feedback and one or more results from results 720 that received neutral or no user feedback, according to one embodiment. Additionally, combined results 770 may not include result 620 from results 720 that received negative user feedback.

In some embodiments, user feedback regarding results may be weighted according to any of various schemes, as described above. Therefore, the ordering of combined results 770 or the specific results included or excluded from combined results 770 may vary from embodiment to embodiment. Additionally, FIGS. 7A-7E represent only one exemplary embodiment and in other embodiments different numbers of queries, results and user feedback may be used when comparing, modifying and combining query results as described herein.

Figure 8:
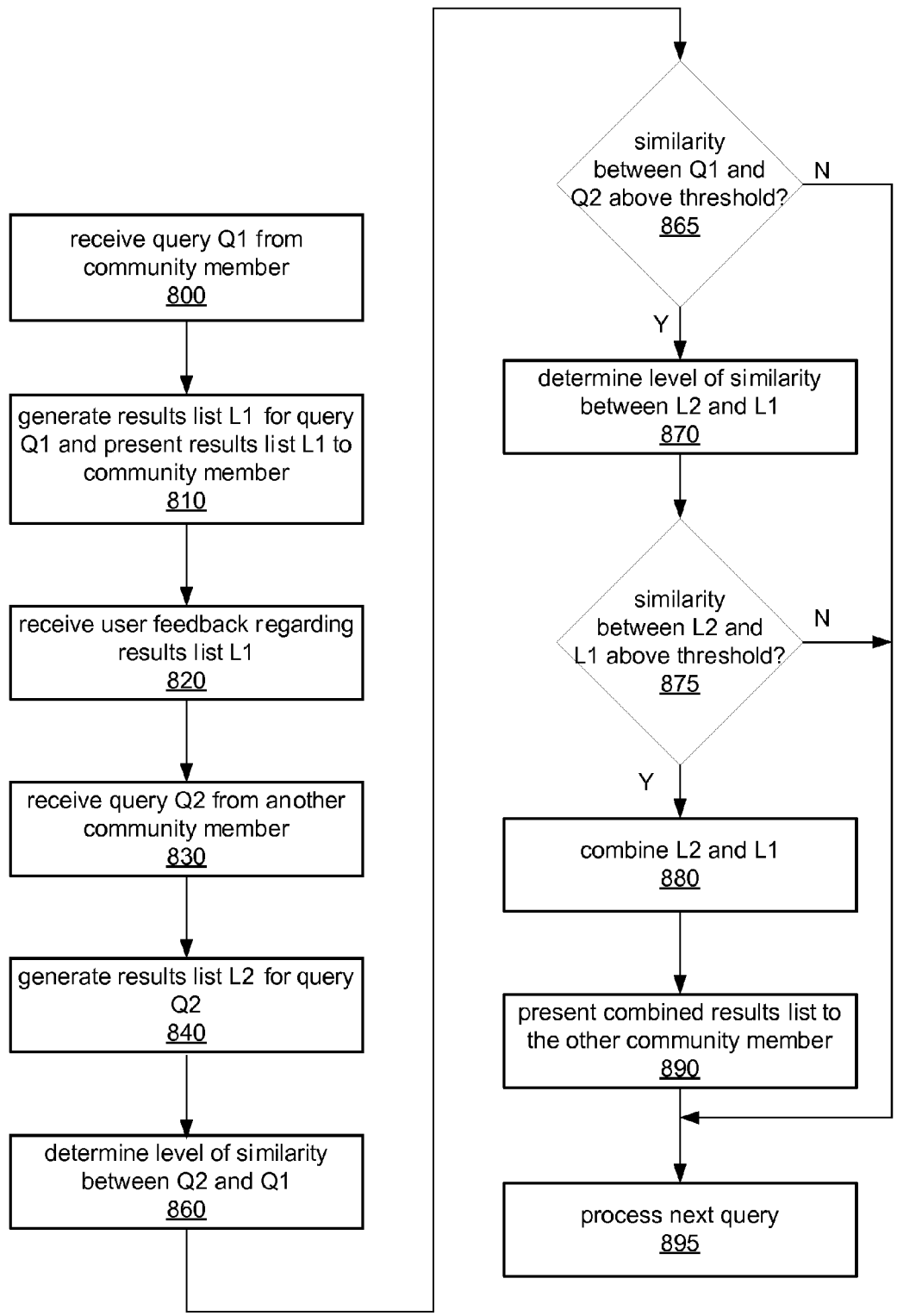
FIG. 8 is a flowchart illustrating one embodiment of a method for combining search results, as described herein.

FIG. 8 is a flowchart illustrating one embodiment of a method for combining search results, such as described above regarding FIGS. 7A-7E. As noted above community search system 100 may receive a query Q1, such as query 710 from community member, as illustrated by block 800. Community search system 100 may then generate results list L1 from query Q1 and present result list L1 to the community member, as indicated by block 810. For instance, as described above regarding FIG. 7A, community search system 100 may obtain result for query Q1, such as results 720, and send them to the user's system.

Community search system 100 may then receive user feedback regarding results list L1 from the user's system, as indicated by block 820. In some embodiments, community search system 100 may generate a modified results list L1* based on the received user feedback. Community search system 100 may also store results lists L1 (or modified results list L1*) along with the received user feedback for subsequent use with additional query results. Thus, when community search system 100 receives another query Q2 from another community member, as in block 830, system 100 may generate results list L2 from query Q2, such as any of the ways described previously.

After obtaining results lists L2 for query Q2, community search system 100 may determine how similar the two query are, as shown in block 860. If, as indicated by the positive output of decision block 865, the two queries are sufficiently similar (e.g., if a measure of similarity between the two queries is above a threshold) community search system 100 may then compare the results lists to determine who similar they are, as indicated by block 870.

Figure 9:
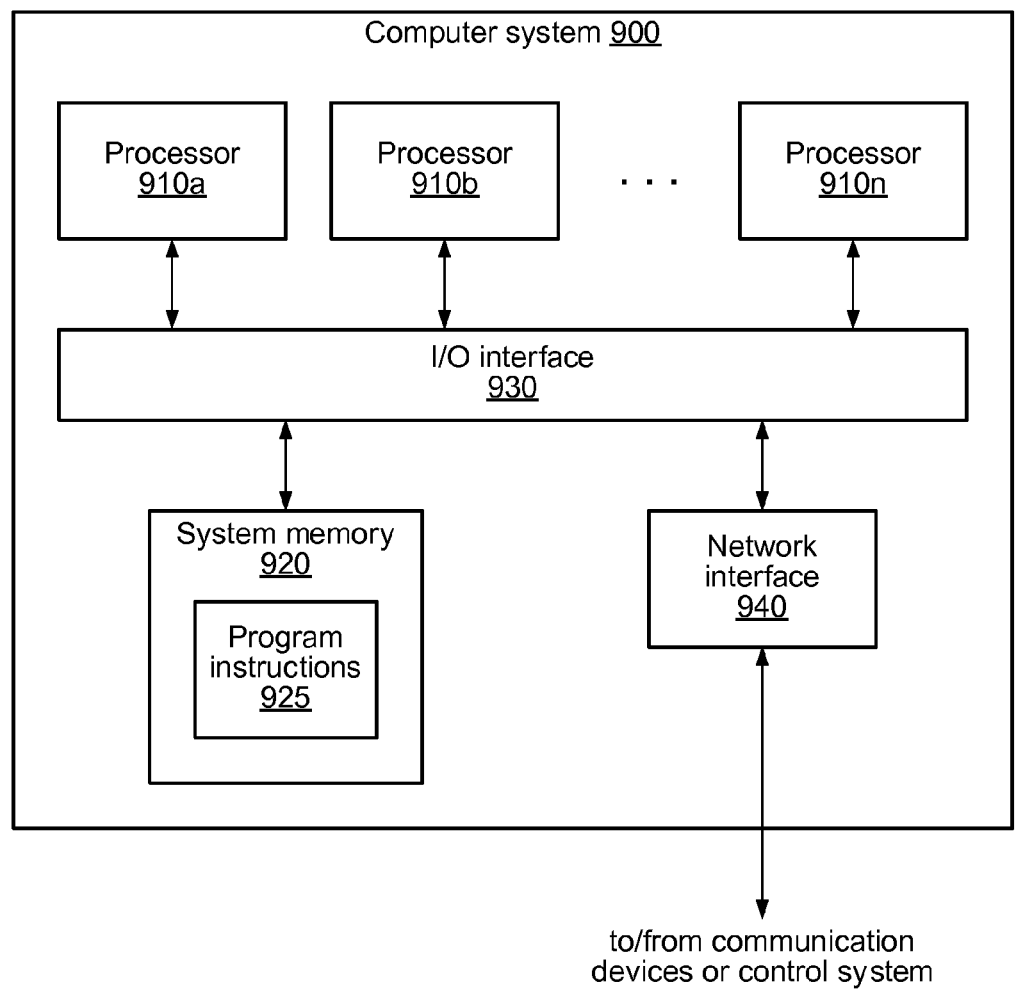
FIG. 9 is a block diagram illustrating an embodiment of a computer system usable to implement community searches, as described herein.

If, as indicated by the positive output of decision block 875, the two results lists are sufficiently similar, the two lists may be combined and delivered to the user as shown in blocks 880 and 890. Community search system 100 may compare and combine results lists using any of the methods, techniques and/or means described herein. After completing the processing of query Q2, and if the queries or results lists were not sufficiently similar (e.g., a measure of similarity was below a predetermined threshold), community search system 100 may process another query, as illustrated by block 895. Additionally, community search system 100 may store or otherwise maintain the query results, either in un-modified or modified form, for use with subsequent queries. Thus, community search system 100 may update a database or other data store of aggregated search results and user feedback for a community FIG. 9 is a block diagram illustrating an embodiment of a computer system usable to implement community searches, as describe herein. In one embodiment, an community search system, such as community search system 100 and/or a user system 110, both illustrated in FIG. 1, may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor 910. In various embodiments, system memory 920 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for system 100, and/or system 110, are shown stored within system memory 920 as code 925. In various embodiments, system memory 920 may comprise program instruction 925 configured and executable by processor 910 to implement community search system 100, browser 160 and/or feedback mechanism 160.

In one embodiment, I/O interface 930 may be configured to coordinate I/O traffic between processor 910, system memory 920 and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments, some or all of the functionality of I/O interface 930, such as an interface to system memory 920, may be incorporated directly into processor 910.

Network interface 940 may be configured to allow data to be exchanged between computer system 900 and other devices attached to a network, such as other computer systems, for example. In particular, network interface 940 may be configured to allow communication between computer system 900 and other computer system described above. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet networks, for example. Additionally, network interface 940 may support communication via telecommunications/telephony networks such as analog voice networks or digital fiber communications networks, via storage area networks such as Fibre Channel SANs, or via any other suitable type of network and/or protocol.

Network(s) 120 may include any suitable data network or combination of networks configured for communicating content requests and content between users systems 110 and hosts 100. For example, network 120 may include one or more Local Area Networks (LANs) such as Ethernet networks, as well as Wide Area Networks (WANs), Metropolitan Area Networks (MANs), or other data or telecommunication networks implemented over any suitable medium, such as electrical or optical cable, or via any suitable wireless standard such as IEEE 802.11 ("Wi-Fi"), IEEE 802.16 ("WiMax"), etc. In various embodiments, all or a portion of network 120 may encompass the network infrastructure commonly referred to as the Internet. In other embodiments, network 120 may be entirely contained within an enterprise and not directly accessible from the Internet. For example, network 120 may be configured as an enterprise intranet where hosts 100 and user systems 110 are local to an enterprise.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 900 via I/O interface 930. A computer-accessible medium may also include any volatile or non-volatile media such as RAM (e.g. SDRAM, DDR SDRAM, RDRAM, SRAM, etc.), ROM, etc, that may be included in some embodiments of computer system 1200 as system memory 9220 or another type of memory. Further, a computer-accessible medium may include transmission media or signals such as electrical, electromagnetic, or digital signals, conveyed via a communication medium such as a network and/or a wireless link, such as may be implemented via network interface 940. In various embodiments, system memory 920 may comprise program instruction 925 configured and executable by processor 910 to implement community search system 100, browser 160 and/or feedback mechanism 160.

Various embodiments may further include receiving, sending or storing instructions and/or data implemented in accordance with the foregoing description upon a computer-readable storage medium. Generally speaking, a computer-readable storage medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc.

The various methods as illustrated in the figures and described herein represent exemplary embodiments of methods. The methods may be implemented manually, in software, in hardware, or in a combination thereof. The order of any method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   a processor; and
   a memory coupled to the processor, wherein the memory comprises program instructions executable by the processor to:
      group users into a plurality of distinct communities according to one or more grouping criteria, such that for each particular one of the communities, members of the particular community share at least one grouping criterion in common, and wherein membership of at least some of the communities does not completely overlap;
      store indications of membership of each of the communities;
      receive a query from a member of one or more of the communities, and in response to the query:
      obtain results of the query;
      determine one or more of the plurality of communities to associate with the query, wherein the determining comprises comparing the query to queries entered by other members of the one or more of the plurality of communities such that the member from which the query is received is a member of the determined one or more communities, and the determined one or more communities are distinct from others of the plurality of communities;
      identify other results from only the determined one or more communities, wherein the other results are for at least one other query from at least one other member of the determined one or more communities, and wherein the other results reflect user feedback from the at least one other member of the determined one or more communities;
      compare the results to the other results from the determined one or more communities to determine a measure of similarity between the results and the other results; and
      modify the results according to the other results in response to determining that the measure of similarity is above a predetermined threshold, wherein the results are not modified according to the other results if the measure of similarity is not above the predetermined threshold.

2. The system of claim 1, wherein the program instructions are further executable to receive user feedback regarding the modified results from the community member, wherein the feedback specifies a level of correctness for at least one of the results, and wherein the feedback comprises feedback explicitly indicated by the community member selecting a positive or negative indication from among a plurality of indications.

3. The system of claim 2, wherein the program instructions are further executable to further modify the results according to the received user feedback.

4. The system of claim 3, wherein to modify the results according to the received user feedback, the program instructions are further executable to modify a ranking of the results, wherein one of the results is ranked higher than another of the results if the received user feedback specifies a higher level of correctness for the one of the results than a level of correctness specified for the another of the first results.

5. The system of claim 2, wherein the program instructions are further executable to compare the received user feedback with user feedback from the another community member for at least one of the other results to determine a level of similarity between the feedback received from the community member and the feedback received from the another community member.

6. The system of claim 1, wherein to modify the results the program instructions are further executable to aggregate the results and the other results to produce aggregated results, wherein the aggregated results include at least one result from the other results that was not in the results obtained for the query.

7. The system of claim 6, wherein to aggregate the results with the other results, the program instructions are executable to determine one or more of the other results for which the user feedback specifies a level of correctness above a pre-defined threshold, and include those results in the aggregated results.

8. The system of claim 6, wherein to aggregate the results with the other results, the program instructions are executable to exclude one or more of the results from inclusion in the aggregated results in response to determining that the user feedback for those results specifies a level of correctness below a pre-defined threshold.

9. The system of claim 1, wherein to determine a measure of similarity between the results and the other results the program instructions are further executable to calculate a ratio of a number of the results in common with the other results to a total number of the results.

10. A computer-implemented method, comprising:
    grouping users into a plurality of distinct communities according to one or more grouping criteria, such that for each particular one of the communities, members of the particular community share at least one grouping criterion in common, and wherein membership of at least some of the communities does not completely overlap;
    storing indications of membership of each of the communities;
    receiving a query from a member of one or more of the communities, and in response to the query:
    obtaining results of the query;
    determining one or more of the plurality of communities to associate with the query, wherein the determining comprises comparing the query to queries entered by other members of the one or more of the plurality of communities such that the member from which the query is received is a member of the determined one or more communities, and the determined one or more communities are distinct from others of the plurality of communities;
    identifying other results from only the determined one or more communities, wherein the other results are for at least one other query from at least one other member of the determined one or more communities, and wherein the other results reflect user feedback from the at least one other member of the determined one or more communities;
    comparing the results to the other results from the determined one or more communities to determine a measure of similarity between the results and the other results; and
    modifying the results according to the other results in response to determining that the measure of similarity is above a predetermined threshold, wherein the results are not modified according to the other results if the measure of similarity is not above the predetermined threshold;

wherein each of said grouping, said storing, said receiving, said obtaining, said identifying, said comparing, and said modifying is performed by one or more computer systems, each comprising at least a processor and a memory.

11. The method of claim 10, further comprising receiving user feedback regarding the modified results from the community member, wherein the feedback specifies a level of correctness for at least one of the results, and wherein the feedback comprises feedback explicitly indicated by the community member selecting a positive or negative indication from among a plurality of indications.

12. The method of claim 11, further comprising modifying the results according to the received user feedback.

13. The method of claim 12, wherein said modifying comprises modifying a ranking of the results, wherein one of the results is ranked higher than another one of the results if the received user feedback specifies a higher level of correctness for the one of the results than a level of correctness specified for the another one of the results.

14. The method of claim 11, further comprising comparing the received user feedback with user feedback from the another community member specifying the correctness of at least one of the other results to determine a similarity measure corresponding to a level of similarity between the feedback received from the community member and the feedback received from the another community member.

15. The method of claim 10, wherein said modifying the results comprises aggregating the results and the other results to produce aggregated results, wherein the aggregated results include at least one result from the other results that was not in the results obtained for the query.

16. The method of claim 15, wherein said aggregating comprises:
   determining one or more of the other results for which the user feedback specifies a level of correctness above a pre-defined threshold; and
   including those results in the aggregated results.

17. The method of claim 15, wherein said aggregating comprises excluding one or more results from inclusion in the aggregated results in response to determining that the user feedback for those results specifies a level of correctness below a pre-defined threshold.

18. A computer-readable storage medium, comprising program instructions executable to implement:
   grouping users into a plurality of distinct communities according to one or more grouping criteria, such that for each particular one of the communities, members of the particular community share at least one grouping criterion in common, and wherein membership of at least some of the communities does not completely overlap;
   storing indications of membership of each of the communities;
   receiving a query from a member of one or more of the communities, and in response to the query:
      obtaining results of the query;
      determining one or more of the plurality of communities to associate with the query, wherein the determining comprises comparing the query to queries entered by other members of the one or more of the plurality of communities such that the member from which the query is received is a member of the determined one or more communities, and the determined one or more communities are distinct from others of the plurality of communities;
      identifying other results from only the determined one or more communities, wherein the other results are for at least one other query from at least one other member of the determined one or more communities, and wherein the other results reflect user feedback from the at least one other member of the determined one or more communities;
      comparing the results to the other results from the determined one or more communities to determine a measure of similarity between the results and the other results; and
      modifying the results according to the other results in response to determining that the measure of similarity is above a predetermined threshold, wherein the results are not modified according to the other results if the measure of similarity is not above the predetermined threshold.

19. The medium of claim 18, wherein the program instructions are further executable to implement receiving user feedback regarding the modified results from the community member, wherein the feedback specifies a level of correctness for at least one of the results, and wherein the feedback comprises feedback explicitly indicated by the community member selecting a positive or negative indication from among a plurality of indications.

20. The medium of claim 19, wherein the program instructions are further executable to implement modifying the results according to the received user feedback.

21. The medium of claim 20, wherein said modifying comprises modifying a ranking of the results, wherein one of the results is ranked higher than another one of the results if the received user feedback specifies a higher level of correctness for the one of the results than a level of correctness specified for the another one of the results.

22. The medium of claim 20, further comprising comparing the received user feedback with user feedback from the another community member specifying the correctness of at least one of the other results to determine a similarity measure corresponding to a level of similarity between the feedback received from the community member and the feedback received from the another community member.

* * * * *